US008359325B1

(12) United States Patent
Gui et al.

(10) Patent No.: US 8,359,325 B1
(45) Date of Patent: Jan. 22, 2013

(54) DETERMINING MATERIALIZED VIEW COVERAGE FOR JOIN TRANSACTIONS

(75) Inventors: Hong Gui, Madison, WI (US); Grace Au, Rancho Palos Verdes, CA (US); Curt J. Ellmann, Madison, WI (US)

(73) Assignee: Teradata US, Inc., Dayton, OH (US)

( * ) Notice: Subject to any disclaimer, the term of this patent is extended or adjusted under 35 U.S.C. 154(b) by 2345 days.

(21) Appl. No.: 10/786,753

(22) Filed: Feb. 25, 2004

(51) Int. Cl.
*G06F 17/00* (2006.01)
(52) U.S. Cl. ......................... 707/760; 707/769
(58) Field of Classification Search .................. None
See application file for complete search history.

(56) References Cited

U.S. PATENT DOCUMENTS

| | | | | |
|---|---|---|---|---|
| 6,026,390 | A | 2/2000 | Ross et al. | 707/2 |
| 6,134,543 | A * | 10/2000 | Witkowski et al. | 707/2 |
| 6,493,699 | B2 | 12/2002 | Colby et al. | 707/2 |
| 2004/0122804 | A1 * | 6/2004 | Zhang et al. | 707/3 |

OTHER PUBLICATIONS

D. Agrawal et al., "Efficient View Maintenance at Data Warehouses," pp. 417-427 (1997).
Yue Zhuge et al., "The Strobe Algorithms for Multi-Souse Warehouse Consistency," pp. 146-157 (1996).
Patrick Valduriez, "Join Indices," ACM Transactions on Databae Systems, vol. 12, No. 2, pp. 218-246 (Jun. 1987).
Jennifer Widom, "Research Problems in Data Warehousing," CIKM, pp. 25-30 (1995).
Richard Winter, "B2B Active Warehousing: Data on Demand," Teradata Review Fall 2000, pp. 1-5, printed from http://www.teradatamagazine.com (2000).
Nick Roussopoulos, "Materialized Views and Data Warehouses," SIGMOD Record 27(1), pp. 21-26 (1998).
Kenneth A. Ross et al., "Materialized View Maintenance and Integrity Constraint Checking: Trading Space for Time," SIGMOD, pp. 447-458 (1996).
TPC Benchmark™ R, Standard Specification Revision 2.1.0, pp. 1-144 (1993).
Jose A. Blakeley et al., "Updating Derived Relations: Detecting Irrelevant and Autonomously Computable Updates," ACM Transactions on Database Systems, vol. 14, No. 3, pp. 369-400 (Sep. 1989).
Surajit Chaudhuri et al., "An Overview of Data Warehousing and OLAP Technology," SIGMOD Record 26(1), pp. 65-74 (1997).
Latha S. Colby et al., "Supporting Multiple View Maintenance Policies," SIGMOD, pp. 405-416 (1997).
Venky Harinarayan et al., "Implementing Data Cubes Efficiently," SIGMOD, pp. 205-216 (1996).
H.V. Jagadish et al, "View Maintenance Issues for the Chronicle Data Model," PODS, pp. 113-124 (1995).
U.S. Appl. No. 09/934,935, filed Aug. 22, 2001, Hong Gui et al.
Wilburt J. Labio et al., "Physical Database Design for Data Warehouses," ICDE, pp. 277-288 (1997).
Dallan Quass et al., "Making Views Self-Maintainable for Data Warehousing," PDIS, pp. 158-169 (1996).
Dallan Quass et al., "On-Line Warehouse View Maintenance," SIGMOD, pp. 393-404 (1997).

* cited by examiner

*Primary Examiner* — Belix M Ortiz Ditren
(74) *Attorney, Agent, or Firm* — Trop, Pruner & Hu P.C.

(57) ABSTRACT

A database system includes database software to receive a query specifying a join of plural base tables, and to determine whether a foreign key and primary key relationship exists between join columns specified by the query and a materialized view definition. Based on the existence of the foreign key and the primary key relationship between join columns specified by the query and the materialized view definition, the database software determines that a result for the received query is to be computed from the materialized view.

25 Claims, 3 Drawing Sheets

DETERMINING MATERIALIZED VIEW COVERAGE FOR JOIN TRANSACTIONS

BACKGROUND

A database is a collection of stored data that is logically related and that is accessible by one or more users. A popular type of database is the relational database management system (RDBMS), which includes relational tables made up of rows and columns. Each row represents an occurrence of an entity defined by a table, with an entity being a person, place, or thing about which the table contains information. To extract data from, or to update, a relational table, queries according to a standard database query language (e.g., Structured Query Language or SQL) are used. A table (also referred to as a relation) is made up of multiple rows (also referred to as tuples). Each row (or tuple) includes multiple columns (also referred to as attributes).

Another data structure typically associated with relations in a relational database system is a view, which is a derived relation formed by performing a function on one or more base relations. Rather than storing the view, the function is typically recomputed each time the view is referenced. This type of view is referred to as an "ordinary view."

Unlike an ordinary view, a materialized view is a pre-computed, stored query result that can be used to respond to certain queries instead of reconstructing the results directly from the base relations. As with the ordinary view, a function is performed on the base relations to derive the materialized view. However, because the materialized view is stored, fast access to the data is possible without recomputing the view.

After the materialized view is created, subsequent queries are able to use the materialized view, where appropriate, to increase query processing speed. Materialized views can be used to assemble data that come from many different relations. One type of view is the join view, which stores join results of multiple base relations. If an optimizer in a database system determines that a given query can be satisfied by using a materialized view, the optimizer performs query rewrite to convert the query to a form that causes rows of the materialized view (instead of base relations) to be accessed. In query rewrite, reference to base table(s) in the query is replaced with reference to the materialized view(s).

Although materialized views can enhance processing speed for queries, materialized views are also associated with maintenance costs. Materialized view maintenance refers to the modification of a materialized view in response to modification of associated base relations(s). A materialized view is modified when any of its underlying base relations is modified. As base relations are changed through insertion of new tuples, deletion of tuples, or update of existing tuples, the corresponding rows in the materialized view are changed to avoid becoming stale.

The cost effectiveness of storing materialized views thus depends on how frequently such materialized views can be used to satisfy subsequent queries.

SUMMARY

In general, methods and apparatus are provided to enhance efficient use of materialized views in a database system. For example, a method for use in a database system includes receiving a query specifying a join of plural base tables, and determining whether a foreign key and primary key relationship exists between join columns specified by the query and a materialized view definition. Based on existence of the foreign key and primary key relationship between join columns specified by the query and the materialized view definition, it is determined that a result for the query is to be computed from the materialized view.

Other or alternative features will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments are possible.

Figure 1:
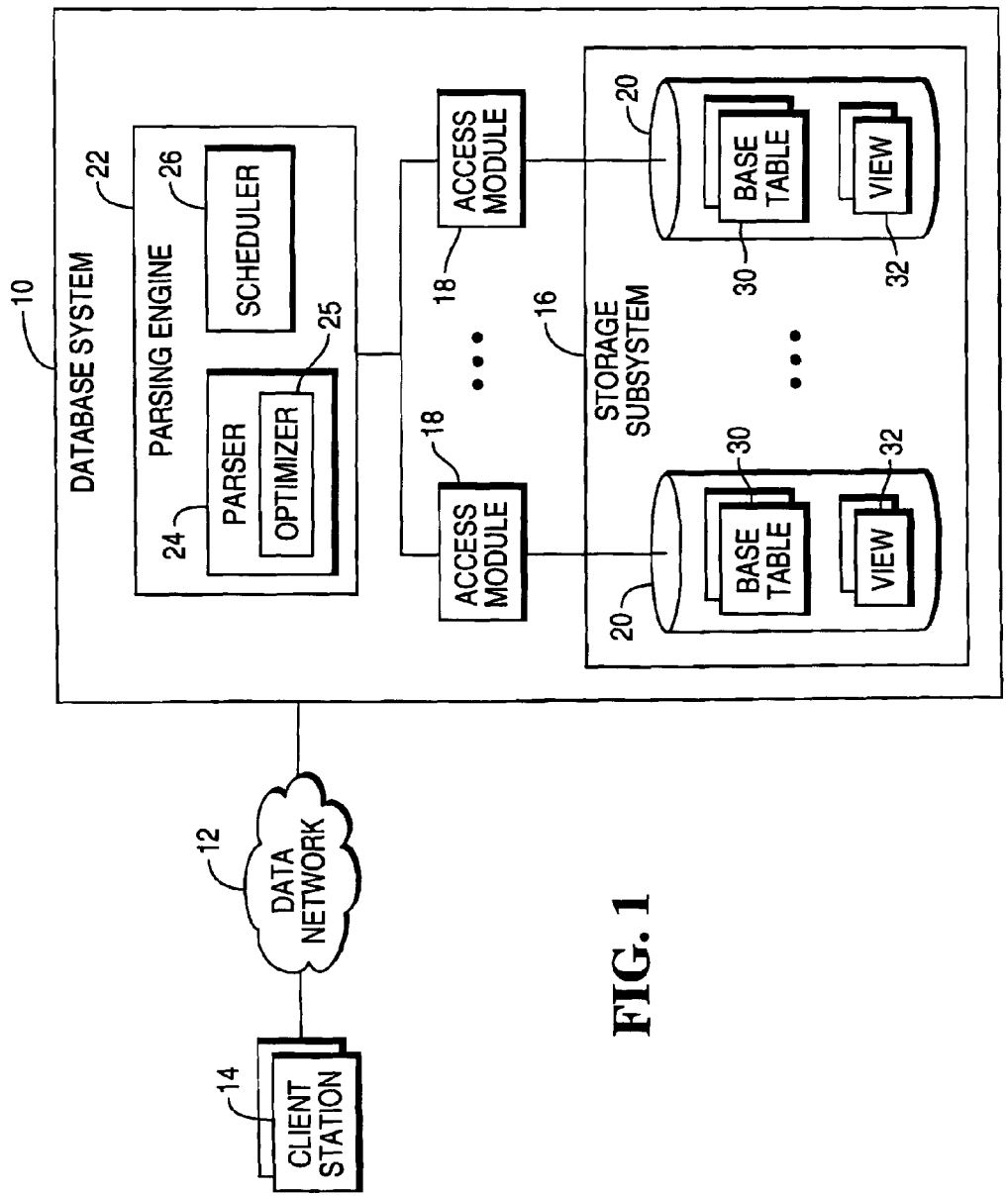
FIG. 1 is a block diagram of an example arrangement including a database system.

FIG. 1 shows an arrangement that includes a database system 10, which is coupled to one or more client stations 14 over a data network 12. Examples of the data network 12 include a local area network (LAN), a wide area network (WAN), the Internet, and so forth. Each of the client stations is capable of issuing queries according to a standard database query language, such as SQL (Structured Query Language), to the database system 10 to access (read, insert, update, or delete) data, or to create, delete or alter data structures (e.g., tables, views, and so forth).

The database system 10 shown in FIG. 1 is an example of a parallel database system having multiple processing units to enable the concurrent processing or access of data stored in a storage subsystem 16. Each processing unit in the database system 10 includes an access module 18 (plural access modules 18 are shown in FIG. 1) and a parsing engine 22. Each access module 18 performs the following tasks: inserts, deletes, or modifies contents of tables; creates, modifies, or deletes definitions of tables; retrieves information from definitions and tables; and locks databases and tables. In one example, each access module 18 is based on an access module processor (AMP) used in some TERADATA® database systems from NCR Corporation.

In the parallel environment of FIG. 1, each of plural base tables 30 are distributed across storage modules 20. Also, the database system 10 includes one or plural views 32, each also distributed across the storage modules 20. Each view 32 stores the result of a corresponding query. The view 32 can be used to satisfy subsequent queries, such that the result for such subsequent queries do not have to be recomputed from base tables 30, which is computationally expensive. Some of the views 32 are join views that store the results of join operations of multiple base tables.

The parsing engine 22 includes a parser 24 and a scheduler 26. The parser 24 checks a received query for syntax. Also, the parser 24 includes an optimizer 25 to generate a query plan or execution plan for the received query. The steps of the query plan are dispatched by the scheduler 26 to the access modules 18 for execution. Effectively, the access modules 18 and parsing engine 22 are part of a database application or database engine of the database system 10.

In accordance of some embodiments of the invention, when determining if a received query can be satisfied by a materialized join view, the database system 10 takes into account whether a foreign key-primary key relationship exists between base tables associated with a materialized join view. If such a foreign key-primary key relationship exists, then there is a possibility that the materialized join view can be used to satisfy a larger set of join queries, which increases efficiency of database processing of join queries. In addition, based on the primary key-foreign key relationship between base tables of a materialized join view, maintenance of the materialized join view in response to certain types of transactions can be skipped, which further increases database efficiency.

A primary key (which includes one or more defined columns of a given table) uniquely identifies each row of the table. In one illustrative example, an employee table contains several columns, including an employee number column, an employee name column, department number column, date of hire column, and so forth. In one implementation, the primary key of such an employee table is the employee number column, since each row of the employee table has a unique employee number. If there is not one column that has unique values in each row of a table, the primary key is defined to include more than one column of the table.

A foreign key identifies table relationships. The foreign key of one table exists as a primary key of another table. Thus, in the above example including the employee table, a second table is a table that contains data relating to employees of a particular department, such as an accounting department (the accounting department table). The accounting department table also includes an employee number column, an employee name column, and other columns. The employee number column can be defined as the foreign key of the accounting department table. In this example, the foreign key of the accounting department table is the primary key of the employee table. Note that all values of a foreign key are present in the primary key—in other words, the values of the foreign key are a subset of, or makes up the same set as, the values of the primary key.

More formally, a foreign key (FK) constraint on a table specifies the referenced table (also called a parent table) and the referenced column(s), which is the primary key (PK) of the parent table. The foreign key defines the referential integrity (RI) between the two tables; that is, all the values in the FK column(s) must be in the PK column(s). The PK-FK constraint regulates the legality of data present in the FK column(s) and the update operations that are allowed to both tables.

When a materialized join view stores the results of a join on FK-PK columns, the materialized join view possesses special properties due to the referential integrity (RI) relationship between the FK-PK columns. A join on FK-PK columns refers to a join where the join condition equates an FK column of one table and the PK column of the parent table. Based on the special properties of FK-PK joins, corresponding join views can be made to cover a more diverse set of join queries as well as reduce occurrences of maintenance that are needed on the join view in response to modifications of base relations of the join view. Although discussed in the context of materialized join views and join queries, it is noted that the techniques discussed here can also be applied to materialized views and queries that do not involve joins.

When a database system receives a query, the optimizer 25 determines whether a materialized view can be used to satisfy the query. If so, then query rewrite is performed by the optimizer 25. In query rewrite, the optimizer 25 decides whether one or more materialized views can be used to answer a query and how the query can be rewritten with the one or more materialized views replacing corresponding base table(s). According to some embodiments of the invention, the optimizer 25, in performing query rewrites, is able to convert outer join queries to inner join queries in response to detecting the presence of a foreign key-primary key relationship.

An inner join is basically a standard join operation that produces results based on a join condition, such as an equijoin condition (e.g., T1.A=T2.B, or a condition where column A of table T1 is equal to column B of table T2). In response to a query containing an equijoin condition, selected columns of matching rows from the multiple base relations specified by the query are projected into a result set. Rows of the base tables that do not satisfy the join condition are not projected into the result set.

With certain applications, it may be desirable to also project unmatched rows of a join into a result set. Projection of unmatched rows into a result set is performed with outer join operations. The result set of an outer join includes the result of an inner join plus any unmatched rows. There are three types of outer joins: full outer join, left outer join, and right outer join. To produce a left outer join, an inner join is first performed of two base tables (first base table and second base table), using matching columns to identify selected rows. For each row of the first table that is not matched by any row in the second table, selected values of the columns in the first table of the un-matching row are added to another row of the result set, where NULL values are inserted for all selected columns of the second table in the added row.

Similarly, to compute a right outer join, an inner join of two tables is first performed, followed by adding selected columns of each un-matching row of the second table to the result set, with selected columns of the first table set to the NULL value. A full outer join is a combination of a left outer join and a right outer join.

Effectively, the difference between outer joins and inner joins is the existence of a set of un-matching rows in the outer join result that does not exist in the inner join result.

Outer and inner joins are further explained in the context of the following examples, assuming tables T1 and T2 as set forth below:

| T1: | X1 | Y1 |
|---|---|---|
| | 1 | 1 |
| | 2 | 2 |
| | 3 | 3 |
| | 4 | 4 |

| T2: | X2 | Y2 |
|---|---|---|
| | 1 | 1 |
| | 3 | 3 |
| | 4 | 4 |
| | 5 | 5 |

An example inner join query is set forth below:
SELECT X1, Y1, X2, Y2
FROM T1, T2
WHERE X1=X2;
The result of the example inner join query is as follows:

| X1 | Y1 | X2 | Y2 |
|----|----|----|----|
| 1  | 1  | 1  | 1  |
| 3  | 3  | 3  | 3  |
| 4  | 4  | 4  | 4  |

In the inner join example, the result table contains only matching rows in which column X1 of table T1 is equal to column X2 of table T2.

An outer join query is specified as follows:
SELECT X1, Y1, X2, Y2
FROM T1
LEFT JOIN ON X1=X/2;
The result of the left outer join is set forth below, where ? indicates a NULL value.

| X1 | Y1 | X2 | Y2 |
|----|----|----|----|
| 1  | 1  | 1  | 1  |
| 2  | 2  | ?  | ?  |
| 3  | 3  | 3  | 3  |
| 4  | 4  | 4  | 4  |

With the left outer join, the un-matched row of the first table T1, the row that contains (2, 2), is inserted into an added row in the join result set. NULL values are inserted for the table T2 columns in the added row of the outer join result set. Thus, in this example, the row (2, 2, ?, ?) in the outer join result is part of the un-matching row set (the set of un-matching rows of the base table(s) involved in the outer join).

In a different example, assume that column X2 is the primary key of table T2. Assume further that there is a referential integrity constraint defined on table T1 such that X1 is a foreign key of table T1 that references column X2 of table T2. If the foreign key-primary key relationship exists, then the row (2, 2) in the example above would not be present in table T1, since the values of X1 in table T1 must be one of the values of X2 in the parent table T2. Thus, with the defined referential integrity, table T1 would include only three rows: (1, 1), (3, 3), (4, 4). As a result, the inner join and outer join of tables T1 and T2 having the referential integrity relationship (or FK-PK relationship) would produce the same result. This is because the outer join of tables T1 and T2 based on an equijoin of the primary key and foreign key of tables T2 and T1 would not produce any un-matching rows.

Mathematically, the FK-PK relationship implies that the values in the FK column(s) form a subset of the set of values in the PK column(s), i.e., $S_{FK} \subset S_{PK}$. Therefore, an equijoin between a parent table's PK column(s) and a child table's FK column(s) results in the un-matching row set being empty so that an outer join is equivalent to the corresponding inner join. Based on this property, a materialized view defined on inner joins (materialized views that contain results of inner joins) can be used to cover outer join queries when there is an FK-PK relationship between the join column(s). Without the FK-PK relationship, materialized views defined on inner joins cannot be used to satisfy outer join queries because outer join queries generally contain a non-empty un-matching row set which is not present in inner join materialized views.

Also, a materialized join view defined on an outer join can cover an inner join query. A materialized join view defined on an outer join stores the result of the outer join. If the outer join associated with the materialized view specifies a join of FK and PK columns, then the materialized view would not store any un-matching rows. In other words, the materialized view defined on an outer join of FK-PK columns stores the same values as a materialized view defined on an inner join of the FK-PK columns.

Conventionally, to use a materialized view defined on an outer join, an IS NOT NULL condition has to be added to an inner join query to enable use of the outer join materialized view for satisfying the inner join query. The IS NOT NULL condition excludes any rows of the outer join materialized view from being projected to the result set of the inner join. In accordance with some embodiments of the invention, if the optimizer 25 determines that a materialized view defined on an outer join can cover an inner join query and there is an FK-PK relationship between the join columns, then the IS NOT NULL condition does not have to be added to the inner join query.

Once the outer join query is converted to an inner join query, due to the equivalency of outer and inner joins when the FK-PK relationship exists, a coverage test instead of identical matching can be performed. Identical matching refers to matching where the predicates in a materialized view and query must be exactly the same, as required for typical outer join-to-outer join mapping. With a coverage test, materialized view can to be used to cover a query as long as the rows requested by the query form a subset of the row set contained in the materialized view. For example, with a materialized view (MV) defined as:
CREATE VIEW MV AS
SELECT X1, X2
FROM T1, T2
WHERE X1=X2; (X1, X2 IS A FK-PK PAIR),
any query with the form:
SELECT X1, X2
FROM T1
LEFT JOIN T2
ON X1=X2 AND C;
can use the materialized view, where C can be any constant condition.

In accordance with some embodiments of the invention, the optimizer 25 implements a conversion rule to specify that either of, or both, a materialized view and query are normalized to inner joins when the original form is an outer join and there is an FK-PK relationship between the join columns. Thus, a materialized view that is defined on an outer join is converted ("normalized") to a materialized view that is defined on an inner join, if the optimizer 25 detects that the outer join query for which the materialized view stores join results specifies a join of an FK column and a PK column. Similarly, an outer join query that is received by the optimizer 25 for processing is converted to an inner join query if the optimizer 25 detects that the outer join query specifies a join of an FK column with a PK column.

Figure 2:
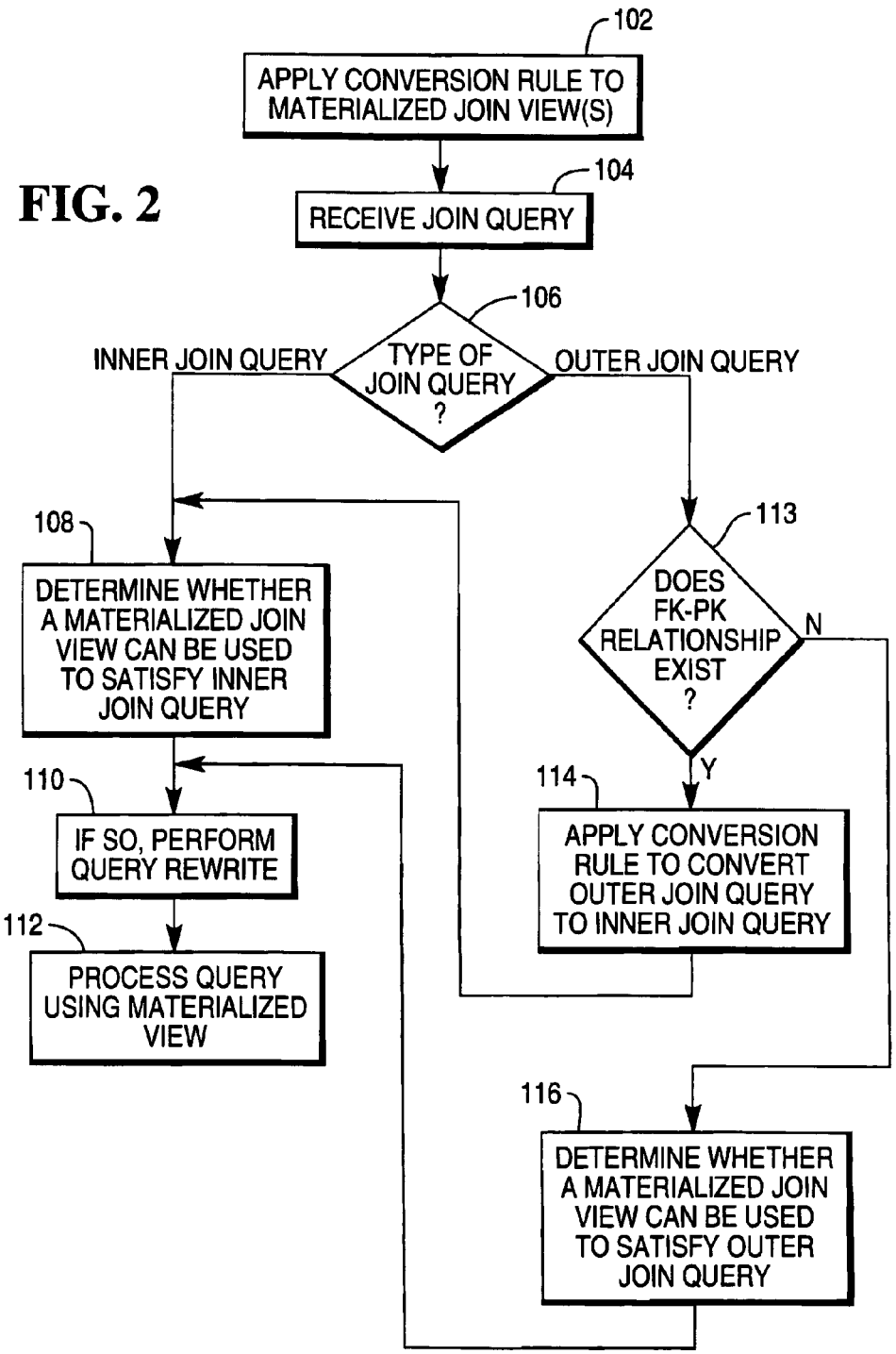
FIG. 2 is a flow diagram of a process of applying a conversion rule to transform outer join materialized views and queries to inner join materialized views and queries, according to an embodiment of the invention.

FIG. 2 is a flow diagram of a process according to an embodiment of determining whether an inner/outer join query can be satisfied from a materialized join view. When computing a materialized join view, the optimizer 25 applies (at 102) the conversion rule to any materialized join view defined on an outer join that specifies a join based on FK and PK columns of a child table and a parent table, respectively. Thus, a materialized join view defined on an outer join is converted to a materialized join view defined on an inner join if the outer join specifies an FK-PK relationship.

Next, the optimizer 25 receives (at 104) a join query. The optimizer 25 determines (at 106) the type of the received join query (either an inner join query or an outer join query). If the received query is an inner join query, the optimizer 25 determines (at 108) whether a materialized join view can be used to satisfy the inner join query. If so, the optimizer 25 performs (at 110) query rewrite to substitute the materialized view in the received query in place of the specified base table(s). The rewritten query is then processed (at 112) by accessing the materialized view.

On the other hand, if the optimizer 25 detects (at 106) that the received join query is an outer join query, then the optimizer determines (at 113) if an FK-PK relationship exists in the outer join query. If so, the optimizer 25 applies (at 114) the conversion rule to rewrite the outer join query as an inner join query. Once converted to the inner join query, processing proceeds according to acts 108, 110, and 112.

However, if the outer join query does not have an FK-PK relationship (as determined at 113), the optimizer determines (at 116) whether a materialized view exists that can be used to satisfy the outer join query. Processing then proceeds according to acts 110 and 112.

The following discusses another enhancement associated with using materialized views to satisfy received queries where FK-PK relationships exist. Conventionally, a materialized view can be used to satisfy a query if the materialized view contains the same set or a subset of tables of the query. In other words, the materialized view containing the result of a join of N ($N \geq 2$) tables can be used to satisfy a join query that specifies M table if $N \leq M$. However, if there are more tables in the materialized view than in the query, the materialized view is conventionally not taken as a candidate for coverage because the extra joins of the materialized view may eliminate rows and/or produce duplicates.

However, in accordance with some embodiments of the invention, since the FK-PK relationship guarantees the losslessness of the FK table in the join with its PK table, the optimizer 25 allows coverage of a query by a materialized view even though the materialized view specifies more tables than the query. The extra tables in the materialized view are allowed if the extra joins allow the materialized view to preserve all the rows for the join result of the subset of tables in the query. Losslessness refers to the fact that when a table containing an FK column (the child table) is joined with a table containing a PK column (the parent table), where the join is based on a match between the FK column and the PK column, no row in the child table is lost because all FK values in the child table appear in the PK column of the parent table.

Another characteristic of the FK-PK relationship is that the join of the FK and PK columns does not cause duplicates to be produced due to the fact that the PK column values are unique.

Figure 3:
FIGS. 3 and 4 illustrate example relationships between base tables of respective materialized views.

In one example, a materialized view is defined on a set of five tables [T1, T2, T3, T4, T5], with FK-PK joins as shown in FIG. 3 (arrows point from a child table to its parent table). In the example of FIG. 3, table T1 is a child table that references table T2 (parent table to table T1). In other words, table T1 contains a foreign key that references a primary key of table T2. Table T2 is a child table with respect to parent table T3 (a foreign key of table T2 references a primary key of table T3). Table T3 is a child table with respect to parent table T4, and similarly, table T4 is a child table with respect to parent table T5.

Queries that specifies joins of subsets of the five tables, such as [T1], [T1, T2], [T1, T2, T3], [T1, T2, T3, T4], can be covered by the materialized view defined on tables T1, T2, T3, T4, T5 as depicted in FIG. 3. This is because the extra joins, either between two tables where one is in the query and the other is not, or between two tables that are both not in the query, will not cause any loss of rows for the join result of the subset of tables in the query. The following types of extra joins can be allowed in the materialized view:

(1) $Xa(FK)=Xb(PK)$: table Ta is in the query, table Tb is not;
(2) $Xa(PK)=Xb(FK)$: table Tb is in the query, table Ta is not;
(3) $Xa(FK)=Xb(PK)$ or $Xa(PK)=Xb(FK)$: both tables Ta and Tb are not in the query.

In case (1) above, the join condition for the materialized view defined on the five tables of FIG. 3 specifies a join between Xa and Xb, where Xa is a foreign key of table Ta, and Xb is a primary key of table Tb. The value of a is any one of $\{1, 2, 3, 4\}$, while the value of b is a+1. In case (1), the table Ta is specified in the query to be processed using the materialized view, while table Tb is not in the received query.

In case (2), the extra join is $Xa=Xb$, where Xa is the primary key of table Ta, and Xb is the foreign key of table Tb. In this case, the value of b is any one of $\{1, 2, 3, 4\}$, while the value of a is b+1. Also, Tb is in the received query, whereas Ta is not.

In case (3), the extra condition is either $Xa (FK)=Xb (PK)$ or $Xa (PK)=Xb(FK)$, where both tables Ta and Tb are not in the received query.

Figure 4:
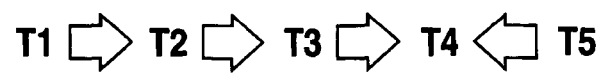

One restriction is added to the above optimization to make the coverage safe: if one table in the materialized view is the parent table of more than one FK table, then the materialized view is disqualified from covering any query with less tables. An example of such a materialized view is shown in FIG. 4, where T4 is the parent table of both T3 and T5. The losslessness of a child table depends on the fact that the parent table has all the PK column values available. The join of the parent table with another child table may make this premise no longer true. Therefore, the final join result cannot be viewed as lossless for any subset of tables.

The following two exceptions can be made with respect to the above restriction:
(a) When the child tables are joined on the FK columns, there will be no loss on any of the child tables because they are all looking for the same PK values in their common parent table.
(b) All child tables reference the same PK column in the PK table. By transitive closure, all these child tables are related by equijoins on the FK columns.

Exception case (a) noted above refers to a situation where two or more child tables reference a common parent table, but the query for the materialized view also specifies a join condition between the foreign keys of the two or more child tables that reference the common parent table. In the context of the example of FIG. 4, exception case (a) is applicable if the query for the materialized view also specifies a join of the foreign key of table T3 with the foreign key of table T5 (in addition to the joins between the foreign key of table T3 with the primary key of table T4, and the join of the foreign key of table T5 with the primary key of table T4).

In exception case (b) above, all child tables that reference a common parent table reference the same primary key of the parent table. In other words, the foreign keys of the child tables reference the same primary key of the common parent table. In the context of the example of FIG. 4, the foreign key of T3 references a primary key of table T4, and the foreign key of table T5 references the same primary key of table T4.

Implicitly, based on the equijoin condition, the foreign key of T3 is equal to the foreign key of T5 (which satisfies exception case (a) above).

Using the optimization discussed above, when using materialized views for satisfying join queries, it is more likely that the optimizer will be able to find coverage by a materialized view of a larger number of received join queries. If there are FK-PK relationships between the join columns of different tables of a materialized view, which is usually the case, the materialized view can be used to answer queries that only look at some of the tables. Without this feature, the user either has to create a different materialized view for each category of queries, which can incur higher cost of maintaining multiple materialized views, or the user may lose the benefit of using a materialized view altogether.

Figure 5:
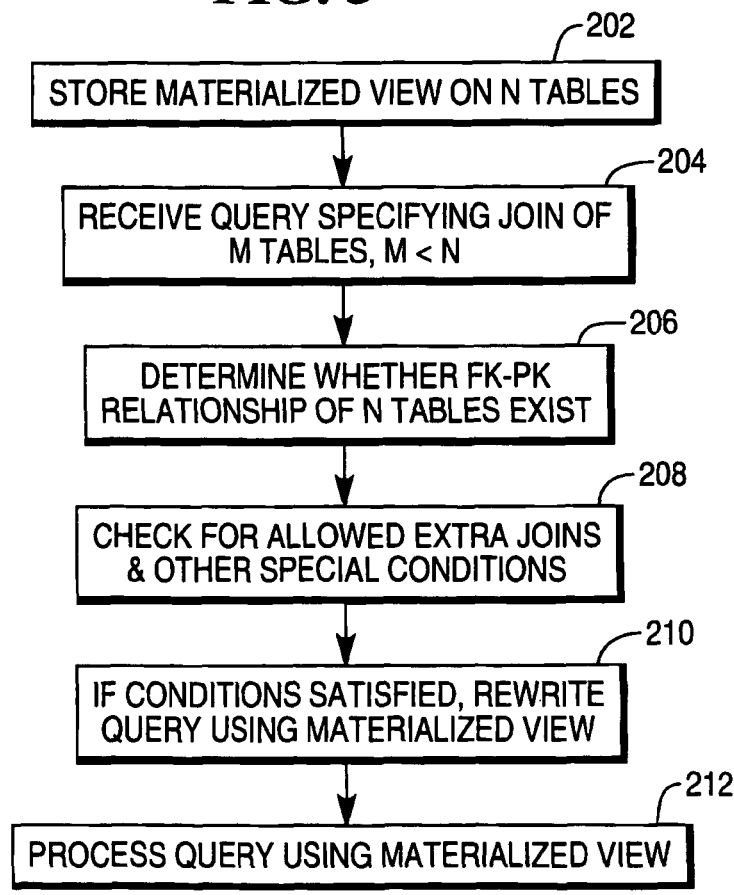
FIG. 5 is a flow diagram of using a materialized view defined on N tables to satisfy a query specifying a join of M tables, where M is less than N, in accordance with an embodiment.

FIG. 5 illustrates a flow diagram of a process of determining whether a materialized view defined on a join of more tables than a received query can be used to satisfy the received query. The optimizer 25 stores (at 202) a materialized view that contains a result of a join on N tables. Next, the optimizer 25 receives (at 204) a query that specifies a join of M tables, where M is less than N. The optimizer 25 then determines (at 206) whether an FK-PK relationship between the N tables of the materialized view exists. If so, then the optimizer 25 checks to determine (at 208) whether allowed extra joins (cases (1), (2), and (3) discussed above) and other special conditions (exception cases (a) and (b)) are satisfied. If such conditions are satisfied, then the optimizer 25 proceeds with a coverage test and rewrites (at 210) the query using the materialized view in place of base table(s) if the coverage test returns true. The query is then processed (at 212) using the materialized view.

Typically, a materialized view is modified whenever a base table of the materialized view is modified, which is a procedure known as materialized view maintenance. Materialized view maintenance adds to the cost of modifying a base table. To reduce the cost of maintaining materialized views, the FK-PK relationship is detected to avoid going through the maintenance process when no modification of the materialized view will be incurred because of the FK-PK relationship. In accordance with some embodiments of the invention, a materialized view containing the result of a join between the primary key of a parent table and a foreign key of a child table does not have to be modified in response to modification (row insert, row delete, or row update) of the parent table.

When a new row is inserted into the parent table containing the PK column, the new row by definition must not have a match in the joining child table. If the new row does have a match in the joining table, then the primary key column of the new row must be a duplicate of one of the existing rows in the inserted table, which violates the PK constraint that all values of the PK be unique. Therefore, a row insert into a parent table containing a PK column does not affect the join result of the materialized view.

If a row deleted from a parent table containing a PK column has a match in the joining child table, the FK-PK constraint will disallow this delete. If a row that does not have a match in the joining table is deleted, the delete does not affect the join result of the materialized view.

An update of the PK column(s) in a parent table can be viewed as an insert followed by a delete. Based on the above observations for insert and delete, such an update of PK column(s) would not change the join result of the materialized view.

Instructions of the various software routines or modules discussed herein (such as the database engine including the optimizer 25 and access module 18, and so forth) are executed on corresponding control modules. The control modules include microprocessors, microcontrollers, processor modules or subsystems (including one or more microprocessors or microcontrollers), or other control or computing devices. As used here, a "controller" refers to hardware, software, or a combination thereof. A "controller" can refer to a single component or to plural components (whether software or hardware).

Data and instructions (of the various software routines or modules) are stored on one or more machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

The instructions of the software routines or modules are loaded or transported to a system in one of many different ways. For example, code segments including instructions stored on floppy disks, CD or DVD media, a hard disk, or transported through a network interface card, modem, or other interface device are loaded into the system and executed as corresponding software modules or layers. In the loading or transport process, data signals that are embodied in carrier waves (transmitted over telephone lines, network lines, wireless links, cables, and the like) communicate the code segments, including instructions, to the system. Such carrier waves are in the form of electrical, optical, acoustical, electromagnetic, or other types of signals.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method for use in a database system, comprising:
  receiving, by software embodied in a computer-readable storage medium and executable in a computer of the database system, a query specifying a join of plural base tables;
  determining, by the software, whether a foreign key and primary key relationship exists between join columns specified by the query and a materialized view definition; and
  determining, by the software, based on existence of the foreign key and primary key relationship between join columns specified by the query and the materialized view definition, that a result for the query is to be computed from the materialized view.

2. The method of claim 1, further comprising storing the materialized view, wherein the materialized view contains a result of a join between a foreign key column of a first base table and a primary key column of a second base table.

3. The method of claim 2, wherein the materialized view is originally defined on an outer join,
  the method further comprising converting the outer join to an inner join based on the join between the foreign key column and the primary key column,
  wherein storing the materialized view comprises storing a result of an inner join.

4. The method of claim 1, further comprising storing the materialized view, the materialized view defined on an inner join,
- wherein receiving the query comprises receiving an outer join query that specifies a join of a foreign key of a first base relation with a primary key of a second base relation,
- the method further comprising converting the outer join query into an inner join query in response to detecting the join of the foreign key column with the primary key column.

5. The method of claim 1, wherein the materialized view is based on the join of the plural base tables, the method further comprising:
- receiving a transaction to modify one of the plural base tables;
- in response to modifying the one of the plural base tables, determining that the materialized view does not have to be modified based on presence of the foreign key and primary key relationship.

6. The method of claim 5, wherein one of the plural base tables comprises a parent table containing a primary key, and another one of the plural base tables comprises a child table containing a foreign key that references the primary key,
- wherein receiving the transaction comprises receiving a transaction to modify the parent table, and
- wherein determining that the materialized view does not have to be modified is based on detecting that the transaction modifies the parent table.

7. The method of claim 1, further comprising storing the materialized view, the materialized view containing a result of a join of a first number of base tables,
- wherein receiving the query comprises receiving a query specifying a join of a second number of base tables, wherein the second number is less than the first number,
- the method further comprising:
- determining whether one or more criteria are satisfied; and
- in response to determining that the one or more criteria are satisfied, rewriting the received query to use the materialized view to satisfy the received query.

8. The method of claim 7, wherein determining the one or more criteria comprises determining that foreign key and primary key relationships exist among the first number of base tables.

9. The method of claim 8, wherein determining that the foreign key and primary key relationships exists among the first number of base tables comprises determining that at least a foreign key of a first table references a primary key of a second table, and a foreign key of the second table references a primary key of a third table.

10. The method of claim 9, wherein determining that the one or more criteria are satisfied further comprises determining that more than one child base table references a common parent base table, and determining that the materialized view specifies a join of the foreign key of the two child tables.

11. The method of claim 9, wherein determining that the one or more criteria are satisfied comprises determining that the foreign keys of two or more child base tables reference the same primary key of the parent table.

12. An article comprising at least one storage medium that contains instructions that when executed cause a database system to:
- store a join view based on plural base tables;
- receive a query specifying a join of plural base tables, wherein the plural base tables specified in the query are at least a subset of the plural base tables of the join view;
- determine whether a foreign key and primary key relationship exists between base tables of the join view and the received query; and
- determine, based on existence of the foreign key and primary key relationship, that a result for the received query is to be computed from a join view.

13. The article of claim 12, wherein storing the join view comprises storing a join view containing a result of a join between a foreign key column of a first base table and a primary key column of a second base table.

14. The article of claim 13, wherein the join view is originally defined on an outer join, the instructions when executed causing the database system to further convert the outer join to an inner join based on the join condition between the foreign key column and the primary key column,
- wherein storing the join view comprises storing a result of an inner join.

15. The article of claim 12, wherein storing the join view comprises storing a join view defined on an inner join,
- wherein receiving the query comprises receiving an outer join query that specifies a join of a foreign key of a first base relation with a primary key of a second base relation,
- the method further comprising converting the outer join query into an inner join query in response to detecting the join of the foreign key column with the primary key column.

16. The article of claim 12, wherein the instructions when executed cause the database system to:
- receive a transaction to modify one of the plural base tables on which the join view is defined;
- in response to modifying the one of the plural base tables of the join view, determine that the join view does not has to be modified based on presence of the foreign key and primary key relationship.

17. The article of claim 12, wherein the join view is defined on a first number of base tables,
- wherein receiving the query comprises receiving a query specifying a join of a second number of base tables, wherein the second number is less than the first number,
- wherein the instructions when executed cause the database system to:
- determine whether one or more criteria are satisfied; and
- in response to determining that the one or more criteria are satisfied, rewrite the received query to use the join view to satisfy the received query.

18. The article of claim 17, wherein determining the one or more criteria comprises determining that foreign key and primary key relationships exist among the first number of base tables.

19. The article of claim 18, wherein determining that the foreign key and primary key relationships exist among the first number of base tables comprises determining that at least a foreign key of a first table references a primary key of a second table, and a foreign key of the second table references a primary key of a third table.

20. The article of claim 19, wherein determining that the one or more criteria are satisfied further comprises determining that more than one child base table references a common parent base table, and determining that the join view specifies a join of the foreign key of the two child tables.

21. The article of claim 19, wherein determining that the one or more criteria are satisfied comprises determining that the foreign keys of two or more child base tables reference the same primary key of the parent table.

22. A database system comprising:
  a storage to store base tables and a join view based on the base tables; and
  a controller to:
    receive a join query, and
    determine whether the join view is to be used to produce a result for the join query based on whether the join query specifies a join of a foreign key of a first base table with a primary key of a second base table.

23. The database system of claim 22, wherein the first and second base tables are part of the plural base tables.

24. The database system of claim 23, wherein the controller is adapted to convert the join view from being defined on an outer join to being defined on an inner join in response to the controller detecting that the outer join specifies a join of a foreign key of one of the plural base tables with a primary key of another one of the plural tables.

25. The database system of claim 22, wherein the join query comprises an outer join query, and wherein the controller is adapted to convert the outer join query to an inner join query in response to detecting that the outer join query specifies a join of the foreign key of the first table with the primary key of the second table.

* * * * *